(12) United States Patent
Lee

(10) Patent No.: US 9,274,623 B2
(45) Date of Patent: Mar. 1, 2016

(54) POSITION INFORMATION INPUT SYSTEM

(71) Applicant: PNF CO., LTD, Seongnam-si, Gyeonggi-do (KR)

(72) Inventor: Jae Jun Lee, Seoul (KR)

(73) Assignee: PNF CO., LTD, Seongnam-Si, Gyeonggi-Do (KR)

( * ) Notice: Subject to any disclaimer, the term of this patent is extended or adjusted under 35 U.S.C. 154(b) by 0 days.

(21) Appl. No.: 14/258,331

(22) Filed: Apr. 22, 2014

(65) Prior Publication Data

US 2015/0138166 A1    May 21, 2015

(30) Foreign Application Priority Data

Nov. 18, 2013 (KR) .......................... 10-2013-0139768

(51) Int. Cl.
| G06F 3/033 | (2013.01) |
| G06F 3/038 | (2013.01) |
| G06F 3/03 | (2006.01) |
| G06F 3/0354 | (2013.01) |
| G06F 3/041 | (2006.01) |
| G06F 3/043 | (2006.01) |

(52) U.S. Cl.
CPC ............ *G06F 3/0383* (2013.01); *G06F 3/0304* (2013.01); *G06F 3/03545* (2013.01); *G06F 3/041* (2013.01); *G06F 3/0433* (2013.01); *G06F 2200/1632* (2013.01)

(58) Field of Classification Search
CPC ... G06F 3/0213; G06F 3/033; G06F 3/03545; G06F 3/0383; G09G 2330/06
See application file for complete search history.

(56) References Cited

U.S. PATENT DOCUMENTS

| 4,814,552 | A | * | 3/1989 | Stefik et al. ................. 178/19.02 |
| 5,973,677 | A | * | 10/1999 | Gibbons ......................... 345/179 |
| 6,188,392 | B1 | * | 2/2001 | O'Connor et al. ............ 345/179 |
| 6,344,848 | B1 | * | 2/2002 | Rowe et al. .................... 345/179 |
| 7,916,124 | B1 | * | 3/2011 | Wood et al. .................... 345/173 |
| 8,363,036 | B2 | * | 1/2013 | Liang ............................. 345/179 |
| 2003/0144814 | A1 | * | 7/2003 | Hama et al. .................... 702/159 |

(Continued)

FOREIGN PATENT DOCUMENTS

KR       10-0418423       9/2002

*Primary Examiner* — Joe H Cheng
(74) *Attorney, Agent, or Firm* — Kile Park Reed & Houtteman PLLC

(57) ABSTRACT

Disclosed are a position information input system capable of coupling a signal generating device and a signal receiving device to each other. Firstly, a coupling unit is formed at a signal receiving device. Under such configuration, a signal generating device and the signal receiving device can be coupled to each other once the signal generating device is coupled to the coupling unit. This can enhance portability and a storage characteristic of the position information input system. Secondly, a contact power switch is installed in the coupling unit. Under such configuration, if a user separates the signal generating device from the signal receiving device for input of position information, the contact power switch is automatically turned on. As a result, the signal receiving device is automatically turned on. On the contrary, if a user, who has completed the input of position information, couples the signal generating device to the signal receiving device, the contact power switch is automatically turned off. As a result, the signal generating device is automatically turned off. This can solve the conventional user's inconvenience, i.e., turning on a power switch for input of position information, and tuning off the power switch upon completion of the input of position information. This can enhance a user's convenience.

9 Claims, 17 Drawing Sheets

(56) References Cited

U.S. PATENT DOCUMENTS

| | | | |
|---|---|---|---|
| 2004/0201580 A1* | 10/2004 | Fujiwara et al. | 345/179 |
| 2004/0212586 A1* | 10/2004 | Denny, III | 345/156 |
| 2007/0268278 A1* | 11/2007 | Paratore et al. | 345/179 |
| 2008/0231614 A1* | 9/2008 | Huang et al. | 345/179 |
| 2008/0264701 A1* | 10/2008 | Radtke et al. | 178/19.01 |
| 2009/0009489 A1* | 1/2009 | Lee | 345/179 |
| 2010/0021022 A1* | 1/2010 | Pittel et al. | 382/123 |
| 2010/0149794 A1* | 6/2010 | Xu | 362/183 |
| 2010/0228523 A1* | 9/2010 | Kajitani et al. | 702/176 |
| 2011/0018844 A1* | 1/2011 | Ko et al. | 345/179 |
| 2012/0105314 A1* | 5/2012 | Lee | 345/156 |
| 2012/0206417 A1* | 8/2012 | Lee | 345/177 |
| 2012/0243174 A1* | 9/2012 | Lee et al. | 361/679.56 |
| 2013/0106723 A1* | 5/2013 | Bakken et al. | 345/173 |
| 2014/0078116 A1* | 3/2014 | Mercea et al. | 345/179 |
| 2014/0247235 A1* | 9/2014 | Lee | 345/173 |
| 2015/0015492 A1* | 1/2015 | Lee | 345/168 |

* cited by examiner (a)

(b)

(a)

(b)

(a)

(b)

(a)

(b)

(a)

(b)

(a)

(b)

(a)

(b)

POSITION INFORMATION INPUT SYSTEM

BACKGROUND OF THE DISCLOSURE

1. Field of the Disclosure

The present disclosure relates to a position information input system, and particularly, to a position information input system using ultrasonic signals.

2. Background of the Disclosure

Recently, various types of electronic devices including a mouse are being presented on the market as a position information input device. An example of the electronic devices is an information input device using ultrasonic waves. The position information input device using ultrasonic waves serves to input position information, by measuring a position of a pen-shaped signal generating device, based on distances between the signal generating device and ultrasonic signal receiving sensors, and a distance between the ultrasonic signal receiving sensors. In this case, the distances are obtained by using differences between a time when a reference signal (e.g., infrared ray, RF signal, etc.) has been received, and times when ultrasonic signals have been received by the ultrasonic signal receiving sensors spaced from each other by a predetermined distance, respectively. The ultrasonic signals which propagate at a speed of sound, and the reference signal which propagates at a speed of light are simultaneously generated by the signal generating device. An example of such position information input device has been disclosed in Korean Patent Publication No. 0418423.

In order to input position information using ultrasonic signals, required are a signal generating device, and a signal receiving device fixed to a position in a separated manner from the signal generating device.

FIG. 1 illustrates an example of a position information input device using ultrasonic signals in accordance with the conventional art, the device presented on the market. As shown in FIG. 1, the conventional position information input device using ultrasonic signals cause a user's inconvenience in portability and storage, because a pen-shaped signal generating device and a signal receiving device should be kept in an additional pouch or case.

SUMMARY OF THE DISCLOSURE

Therefore, an aspect of the detailed description is to provide a position information input system capable of enhancing portability and a storage characteristic by coupling a signal generating device and a signal receiving device to each other.

To achieve these and other advantages and in accordance with the purpose of this specification, as embodied and broadly described herein, there is provided a position information input system, comprising: a signal generating device formed to have a pen shape, and configured to generate ultrasonic signals and a reference signal; and a signal receiving device configured to generate position information by measuring a position of the signal generating device by receiving the ultrasonic signal and the reference signal from the signal generating device, or configured to generate position measuring information used to measure a position of the signal generating device by receiving the ultrasonic signal and the reference signal from the signal generating device, and to transmit the position information or the position measuring information to an external electronic device, wherein a coupling unit, configured to couple the signal generating device to the signal receiving device, is formed at a housing of the signal receiving device.

In the position information input system, a contact power switch may be installed on a surface of the housing in correspondence to the signal generating device, and the contact power switch may be turned on or off by contacting the signal generating device, to turn on or off the signal receiving device.

In the position information input system, a first charging terminal may be installed at the signal generating device, and a second charging terminal may be installed at the housing, so as to contact the first charging terminal in a coupled state between the signal generating device and the signal receiving device.

In the position information input system, a second charging power source connection unit, configured to connect external charging power source to the second charging terminal, may be installed at the signal receiving device. The external charging power source, connected to the second charging power source connection unit, may simultaneously charge the signal receiving device and the signal generating device in a connected state between the first charging terminal and the second charging terminal.

In the position information input system, a first charging power source connection unit, configured to connect external charging power source to the first charging terminal, may be installed at the signal generating device. The external charging power source, connected to the first charging power source connection unit, may simultaneously charge the signal receiving device and the signal generating device in a connected state between the first charging terminal and the second charging terminal.

In the position information input system, the coupling unit may be coupled to the signal generating device by a magnetic substance. If the signal generating device is coupled to the coupling unit, the contact power switch may be turned off to turn off the signal receiving device. On the contrary, if the signal generating device is separated from the coupling unit, the contact power switch is turned on to turn on the signal receiving device.

In the position information input system, the coupling unit may be implemented as a magnetic substance or a metallic member, and the signal generating device may include a magnetic substance or a metallic member so as to be coupled to the coupling unit by a magnetic force.

In the position information input system, a first charging power source connection unit, configured to connect external charging power source to the first charging terminal, may be installed at the signal generating device. A second charging power source connection unit, configured to connect external charging power source to the second charging terminal, may be installed at the signal receiving device. The external charging power source, connected to the first charging power source connection unit or the second charging power source connection unit, may be simultaneously connected to the first charging terminal and the second charging terminal, in a connected state between the first charging terminal and the second charging terminal, such that the signal generating device and the signal receiving device are simultaneously charged by one external charging power source.

In the position information input system, the coupling unit may be implemented as an accommodation groove formed in the housing. The contact power switch, which is turned on or off by contacting an outer surface of the signal generating device, may be installed in the accommodation groove. If the signal generating device is inserted into the accommodation groove, the contact power switch may be turned off to turn off the signal receiving device. On the contrary, if the signal generating device is separated from the accommodation groove, the contact power switch is turned on to turn on the signal receiving device.

In the position information input system, the coupling unit may be implemented as a through hole formed in the housing along a lengthwise direction of the signal generating device. The contact power switch, which is turned on or off by contacting an outer surface of the signal generating device, may be provided in the through hole. If the signal generating device is inserted into the through hole, the contact power switch may be turned off to turn off the signal receiving device. On the contrary, if the signal generating device is separated from the through hole, the contact power switch is turned on to turn on the signal receiving device.

In the position information input system, the coupling unit may be implemented as a pair of fixing units integrally formed with the housing and outward extending from one side surface of the housing. A coupled state between the signal generating device and the coupling unit may be maintained as the signal generating device is inserted between the pair of fixing units. The contact power switch, which is turned on or off by contacting an outer surface of the signal generating device, may be provided on an outer surface of the housing between the pair of fixing units. If the signal generating device is inserted between the pair of fixing units, the contact power switch may be turned off to turn off the signal receiving device. On the contrary, if the signal generating device is separated from the pair of fixing units, the contact power switch may be turned on to turn on the signal receiving device.

In the position information input system, the coupling unit may be implemented as a pair of fixing units coupled to the housing so as to face each other with an interval therebetween. The signal generating device may be inserted between the pair of fixing units, to thus maintain a coupled state to the coupling unit by an elastic force of the fixing units. The contact power switch, which is turned on or off by contacting an outer surface of the signal generating device, may be provided on an outer surface of the housing between the pair of fixing units. If the signal generating device is inserted between the pair of fixing units, the contact power switch is turned off to turn off the signal receiving device. On the contrary, if the signal generating device is separated from the pair of fixing units, the contact power switch may be turned on to turn on the signal receiving device.

In the position information input system, the coupling unit may include a bonding unit adhered to the housing; and a pair of fixing units extending from both ends of the bonding unit in a vertical direction. The signal generating device may be inserted between the pair of fixing units, to thus be fixed by an elastic force of the pair of fixing units. A contact power switch groove, through which the contact power switch formed at the housing is exposed to outside to thus contact the signal generating device, may be formed in the bonding unit. If the signal generating device is inserted between the pair of fixing units, the contact power switch may be turned off to turn off the signal generating device. On the contrary, if the signal generating device is separated from the pair of fixing units, the contact power switch may be turned on to turn on the signal generating device.

In the position information input system, the coupling unit may have one side surface adhered to one side surface of the housing. The coupling unit may be provided therein with an accommodation groove for accommodating the signal generating device. A contact power switch groove, through which the contact power switch contacts the signal generating device accommodated in the accommodation groove, may be formed at a contact surface between the coupling unit and the housing.

In the position information input system, the coupling unit may have one side surface adhered to one side surface of the housing. The coupling unit may be provided therein with a through hole formed in a lengthwise direction of the signal generating device. A contact power switch groove, through which the contact power switch contacts the signal generating device inserted into the through hole, may be formed at a contact surface between the coupling unit and the housing.

In the position information input system, the coupling unit may be formed of a transparent plastic material.

In the position information input system, the signal receiving device may further include a hand power switch configured to turn on or off the signal receiving device, by supplying power to the signal receiving device or by disconnecting power supply to the signal receiving device, through a user's manipulation, in an 'ON' state of the contact power switch and the signal receiving device.

In the position information input system, the signal receiving device may further include: a signal receiving module having a reference signal receiving portion configured to receive a reference signal generated by the signal generating device, and having a plurality of ultrasonic signal receiving portions spaced from each other by a predetermined distance, and configured to receive ultrasonic signals generated by the signal generating device; a position measuring unit configured to generate position information by measuring a position of the signal generating device by measuring distances between the signal generating device and the plurality of ultrasonic signal receiving portions based on differences between a time when a reference signal has been received by the reference signal receiving portion, and times when ultrasonic signals have been received by the ultrasonic signal receiving portions, respectively, or to generate position measuring information used to measure a position of the signal generating device by measuring distances between the signal generating device and the plurality of ultrasonic signal receiving portions based on differences between a time when a reference signal has been received by the reference signal receiving portion, and times when ultrasonic signals have been received by the ultrasonic signal receiving portions, respectively; the contact power switch configured to provide power input from a power source unit to the signal receiving module and the position measuring unit, when turned on by contacting the signal generating device; and a hand power switch configured to supply power output from the power source unit to the signal receiving module and the position measuring unit, or configured to disconnect the power supply, through a user's manipulation in an 'ON' state of the contact power switch.

The present invention can have the following advantages.

Firstly, the coupling unit is formed at the signal receiving device. Under such configuration, the signal generating device and the signal receiving device can be coupled to each other once the signal generating device is coupled to the coupling unit. This can enhance portability and a storage characteristic of the position information input system.

Secondly, the contact power switch is installed in the coupling unit. Under such configuration, if a user separates the signal generating device from the signal receiving device for input of position information, the contact power switch is automatically turned on. As a result, the signal receiving device is automatically turned on. On the contrary, if a user, who has completed the input of position information, couples the signal generating device to the signal receiving device, the contact power switch is automatically turned off. As a result, the signal generating device is automatically turned off. This can solve the conventional user's inconvenience, i.e., turning on a power switch for input of position information, and tuning off the power switch upon completion of the input of position information. This can enhance a user's convenience.

Thirdly, the charging terminals installed at the signal receiving device and the signal generating device come in contact with each other, in a coupled state between the signal receiving device and the signal generating device. Under such configuration, if charging power is applied to only one of the signal generating device and the signal receiving device, the signal generating device and the signal receiving device are simultaneously charged. This can enhance a user's convenience in charging.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, preferred embodiments of the present invention will be explained in more detail with reference to the attached drawings.

Figure 1:
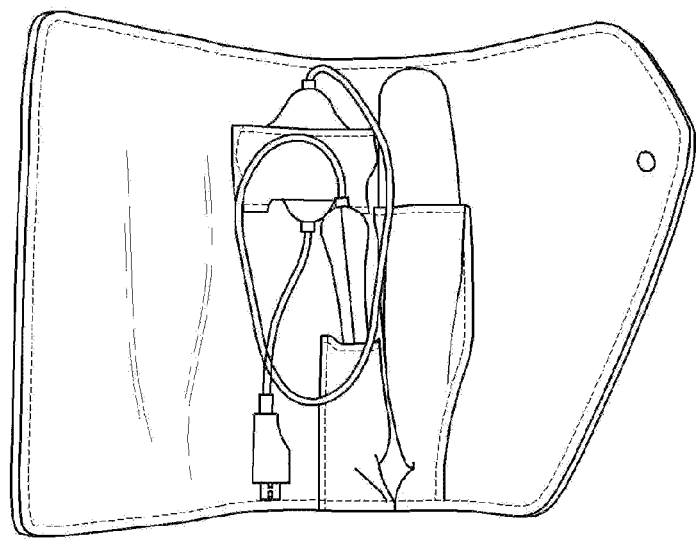
FIG. 1 is a view illustrating a position information input system using ultrasonic signals which is presented on the market, in accordance with the conventional art.
Figure 2:
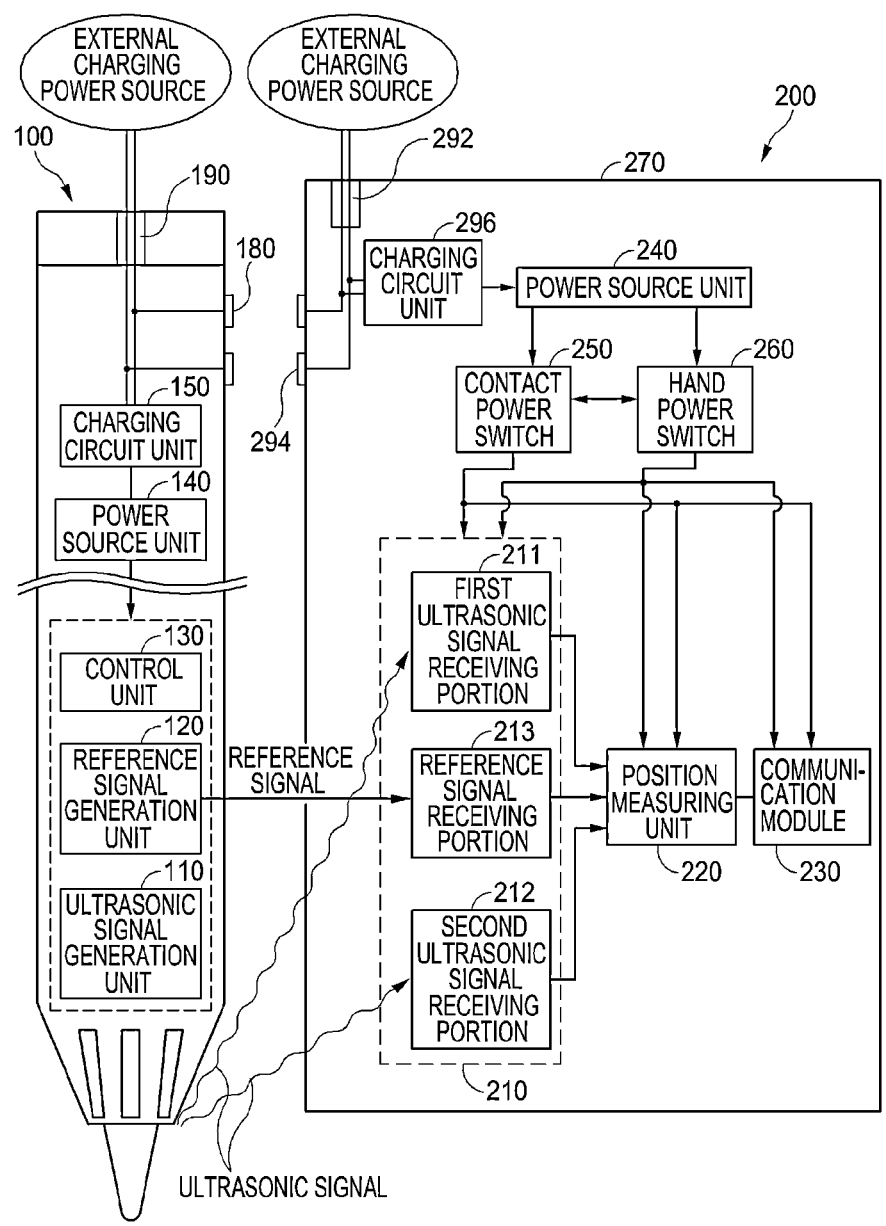
FIG. 2 is a block diagram illustrating a configuration of a position information input system according to preferred embodiments of the present invention.

FIG. 2 is a block diagram illustrating a configuration of a position information input system according to preferred embodiments of the present invention.

Referring to FIG. 2, the position information input system according to preferred embodiments of the present invention comprises a signal generating device 100 formed to have a pen shape, and configured to generate an ultrasonic signal and a reference signal; and a signal receiving device 200 configured to generate position information by measuring a position of the signal generating device 100 by receiving the ultrasonic signal and the reference signal from the signal generating device 100, or configured to generate position measuring information used to measure a position of the signal generating device 100, and to transmit the position measuring information to an external electronic device (not shown) such as a smart phone or a tablet PC.

The signal generating device 100 includes a first charging power source connection unit 190, a first charging terminal 180, a charging circuit unit 150, a power source unit 140, a control unit 130, a reference signal generation unit 120 and an ultrasonic signal generation unit 110.

The first charging power source connection unit 190 is configured to connect external charging power source to the first charging terminal 180 and the charging circuit unit 150. The first charging terminal 180 comes in contact with a second charging terminal 294 of the signal receiving device 200, thereby connecting external charging power source connected to the signal receiving device 200 to the charging circuit unit 150.

The charging circuit unit 150 is configured to charge the power source unit 140 implemented as a secondary cell, using power supplied from external charging power source through the first charging power source connection unit 190 or the first charging terminal 180.

The reference signal generation unit 120 is configured to generate a reference signal such as an infrared ray signal or an RF signal, at constant time intervals. The ultrasonic signal generation unit 110 is configured to generate an ultrasonic signal at the same time as the reference signal is generated by the reference signal generation unit 120. The control unit 130 is configured to control the reference signal generation unit 120 and the ultrasonic signal generation unit 110. The power source unit 140 is configured to supply power to each of the components.

A housing 270 of the signal receiving device 200 includes therein a signal receiving module 210, a position measuring unit 220, a contact power switch 250, a hand power switch 260, a power source unit 240, a communication module 230, a charging circuit unit 296, a second charging power source connection unit 292 and a second charging terminal 294.

The signal receiving module 210 includes a reference signal receiving portion 213 configured to receive a reference signal generated by the signal generating device 100; and a plurality of ultrasonic signal receiving portions 211, 212 spaced from each other by a predetermined distance, and configured to receive ultrasonic signals generated by the signal generating device 100.

The position measuring unit 220 is configured to generate position information by measuring a position of the signal generating device 100, by measuring distances between the signal generating device 100 and the plurality of ultrasonic signal receiving portions 211, 212, based on differences between a time when a reference signal has been received by the reference signal receiving portion 213, and times when ultrasonic signals have been received by the ultrasonic signal receiving portions 211, 212, respectively and to output the position information to the communication module 230. Alternatively, the position measuring unit 220 is configured to generate position measuring information used to measure a position of the signal generating device 100 (i.e., information on distances between the signal generating device 100 and the ultrasonic signal receiving portions 211, 212), and to output the position measuring information to the communication module 230.

The contact power switch 250 is provided in the housing 270. As explained later, once the signal generating device 100 is coupled to a coupling unit (not shown) formed at the housing 270, the contact power switch 250 contacts the signal generating device 100 to thus be turned on. On the contrary, once the signal generating device 100 is separated from the coupling unit (not shown) formed at the housing 270, the contact power switch 250 is separated from the signal generating device 100 to thus be switched off. If the contact power switch 250 is turned on, the power source unit 240 is connected to the signal receiving module 210, the position measuring unit 220 and the communication module 230. As a result, power from the power source unit 240 is supplied to the signal receiving module 210, the position measuring unit 220 and the communication module 230. On the other hand, if the contact power switch 250 is switched off, power supply to the signal receiving module 210, the position measuring unit 220 and the communication module 230 from the power source unit 240 is disconnected.

The hand power switch 260 is configured to supply power output from the power source unit 240 to the signal receiving module 210, the position measuring unit 220 and the communication module 230, or to disconnect the power supply, through a user's manipulation.

The power source unit 240 is implemented as a primary cell or a secondary cell, and is configured to supply power to other components of the signal receiving device 200.

The communication module 230 is implemented as a wireless communication module such as WiFi, Bluetooth or Zigbee etc., or is implemented as a wired communication device such as a USB connector. The communication module 230 is configured to transmit position information or position measuring information, to an external electronic device such as a smart phone or a tablet PC.

The second charging power source connection unit 292 is connected to external charging power source, thereby supplying external power to the charging circuit unit 296 and the second charging terminal 294. The second charging terminal 294 contacts the first charging terminal 180 in a coupled state between the signal generating device 100 and the signal receiving device 200. The charging circuit unit 296 is configured to charge the power source unit 240, using the external power supplied through the second charging power source connection unit 292 or the second charging terminal 294.

As aforementioned, in a coupled state between the signal generating device 100 and the signal receiving device 200, the first charging terminal 180 and the second charging terminal 294 come in contact with each other. Under the state, even if external charging power source is connected to one of the first charging power source connection unit 190 and the second charging power source connection unit 292, both of the signal generating device 100 and the signal receiving device 200 can be charged.

In the aforementioned embodiment with reference to FIG. 2, the signal generating device 100 is provided with the first charging power source connection unit 190, and the signal receiving device 200 is provided with the second charging power source connection unit 292. However, in another embodiment of the present invention, only the signal receiving device 200 may be provided with the second charging power source connection unit 292. In this case, external charging power source connected to the second charging power source connection unit 292 may simultaneously charge the signal receiving device 200 and the signal generating device 100, in a contacted state between the first charging terminal 180 and the second charging terminal 294.

In this case, the external charging power source may be connected only to the charging circuit unit 296, and the charging circuit unit 296 may be configured to output a charging current to the power source unit 240 and the second charging terminal 294. Under such configuration, if the first charging terminal 180 and the second charging terminal 294 come in contact with each other, the power source unit 140 of the signal generating unit 100 can directly receive a charging current from the charging circuit unit 296. This may allow the charging circuit unit 150 of the signal generating unit 100 to be omitted.

Likewise, only the signal generating device 100 may be provided with the first charging power source connection unit 190. In this case, external charging power source connected to the first charging power source connection unit 190 may simultaneously charge the signal receiving device 200 and the signal generating device 100, in a contacted state between the first charging terminal 180 and the second charging terminal 294.

In this case, the external charging power source may be connected only to the charging circuit unit 150, and the charging circuit unit 150 may be configured to output a charging current to the power source unit 140 and the first charging terminal 180. Under such configuration, if the second charging terminal 294 and the first charging terminal 180 come in contact with each other, the power source unit 240 of the signal receiving unit 200 can directly receive a charging current from the charging circuit unit 150. This may allow the charging circuit unit 296 of the signal receiving unit 200 to be omitted.

A coupling unit, configured to couple the signal generating device 100 to the signal receiving device 200, is formed at the housing 270 of the signal receiving device 200. A configuration of the coupling unit will be explained in more detail with reference to FIGS. 3 to 10B.

Figure 3:
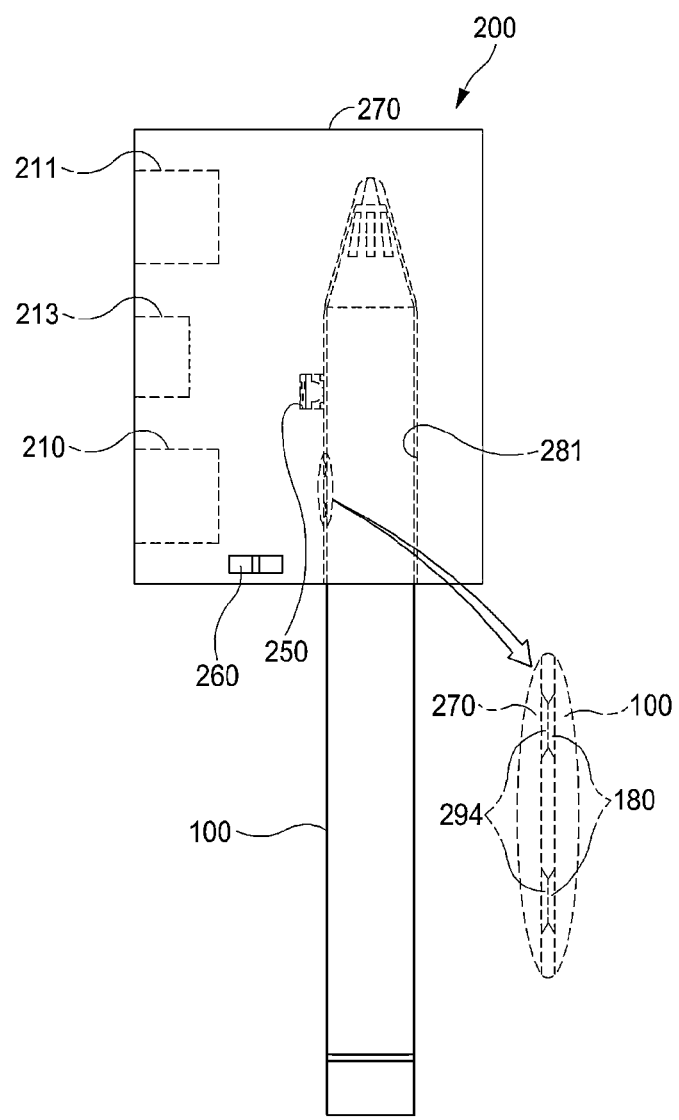
FIG. 3 is a view illustrating an appearance of a position information input system according to a first embodiment of the present invention.

FIG. 3 is a view illustrating an appearance of the position information input system according to a first embodiment of the present invention.

Referring to FIG. 3, a coupling unit 281, to which the signal generating device 100 is coupled, is implemented as an accommodation groove 281 formed in the housing 270 of the signal receiving device 200. As shown in FIG. 3, the contact power switch 250, which is turned on or off by contacting an outer surface of the signal generating device 100, is installed on an inner surface of the accommodation groove 281. The contact power switch 250 according to a preferred embodiment of the present invention is implemented as a detector switch. The contact power switch 250 is turned off when pressure is applied thereto from outside, but is turned on by being protruded toward outside when the pressure applied thereto is removed.

Once the signal generating device 100 is inserted into the accommodation groove 281, the contact power switch 250 comes in contact with the signal generating device 10 to thus be turned off. Accordingly, power supply to the signal receiving module 210, the position measuring unit 220, the communication module 230, etc., from the power source unit 240 is disconnected. As a result, the signal receiving device 200 is turned off.

As aforementioned, in a coupled state between the signal generating device 100 and the signal receiving device 200, the first charging terminal 180 and the second charging terminal 294 come in contact with each other. Under the state, even if external charging power source is connected to one of the first charging power source connection unit 190 and the second charging power source connection unit 292, both of the signal generating device 100 and the signal receiving device 200 can be charged.

If a user separates the signal generating device 100 from the accommodation groove 281 for input of position information, the contact power switch 250, which has been turned off by contacting the signal generating device 100, is turned on. As a result, power from the power source unit 240 is supplied to the signal receiving module 210, the position measuring unit 220, the communication module 230, etc., thereby turning on the signal receiving device 200.

Under such configuration, a user has only to separate the signal generating device 100 from the accommodation groove 281 of the signal receiving device 200, for input of position information. Accordingly, the user can turn on the signal receiving device 200 in a simple manner, without any efforts to manipulate an additional power button. Upon completion of the information input, the user has only to couple the signal generating device 100 to the accommodation groove 281 of the signal receiving device 200. Accordingly, the user can turn off the signal receiving device 200 in a simple manner, without any efforts to manipulate an additional power button. Further, the user can carry the signal generating device 100 and the signal receiving device 200 in a convenient manner.

In the first embodiment of the present invention, the hand power switch 260 is installed at the housing 270 of the signal receiving device 200. The hand power switch 260 is configured to disconnect power supply to other components from the power source unit 240, or to resume the power supply, through a user's manipulation, in an 'ON' state of the contact power switch 250. If a user, who is inputting position information using the signal generating device 100, wishes to temporarily stop the input of position information, the user turns off the hand power switch 260 of the signal receiving device 200. This can allow the signal receiving device 200 to be turned off, without an operation to couple the signal generating device 100 to the accommodation groove 281. Further, the user may resume the input of position information by turning on the hand power switch 260.

Figure 4A:
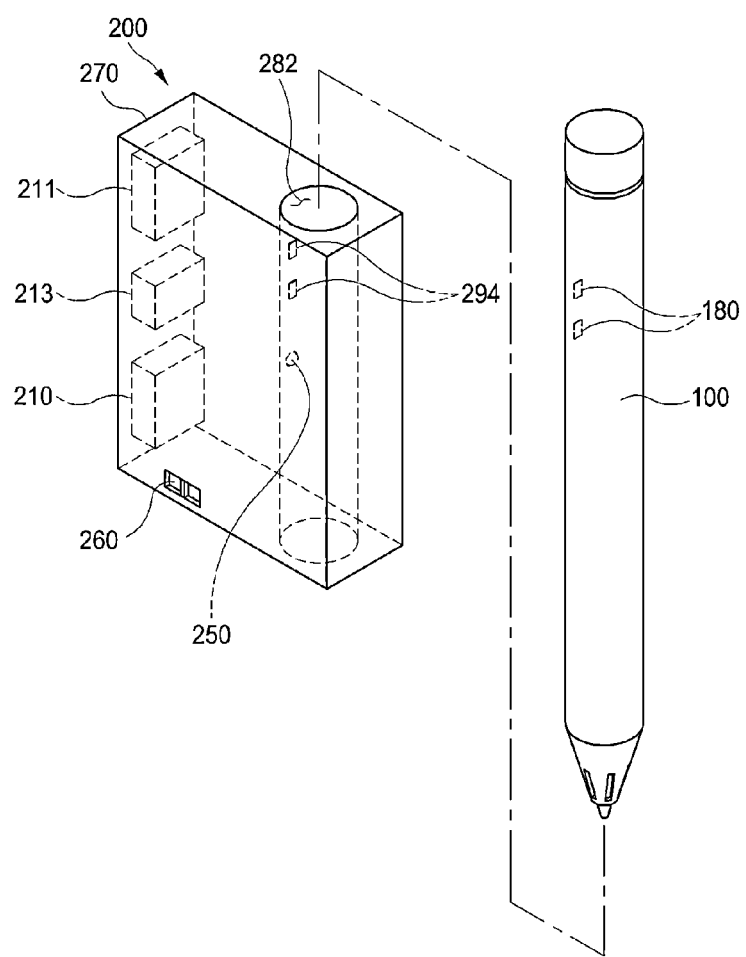
FIGS. 4A and 4B are views illustrating a configuration of an information input system according to a second embodiment of the present invention.
Figure 4B:
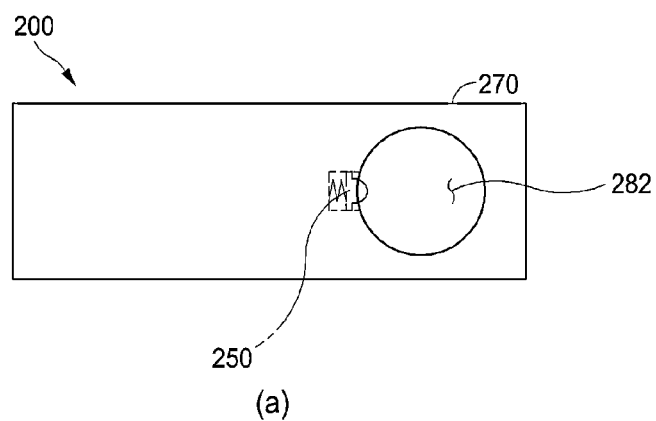
Figure 4B:
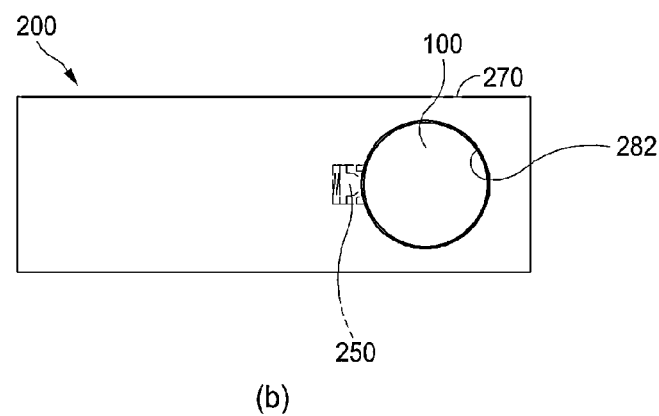

FIGS. 4A and 4B are views illustrating a configuration of an information input system according to a second embodiment of the present invention. Referring to FIGS. 4A and 4B, the information input system according to a second embodiment has a similar configuration as the information input system according to a first embodiment, in that a coupling unit 282 is formed in the housing 270 of the signal receiving device 200.

As shown in FIGS. 4A and 4B, a through hole 282 is formed in the housing 270 along a lengthwise direction of the signal receiving device 200. Accordingly, the through hole 282 of the second embodiment may have the same shape as the coupling unit 281 of the first embodiment, if both ends of the coupling unit 281 configured as the accommodation groove are open. A sectional surface of the through hole 282 is formed to have the same shape as a sectional surface of the signal generating device 100. Once the signal generating device 100 is inserted into the through hole 282 in a state where the contact power switch 250 has been installed in the through hole 282, the contact power switch 250 is turned off to turn off the signal receiving device 200 (refer to FIG. 4B(b)). In a coupled state between the signal generating device 100 and the signal receiving device 200, the first charging terminal 180 and the second charging terminal 294 come in contact with each other, so that both of the signal generating device 100 and the signal receiving device 200 can be charged. Such configuration is the same as the configuration of the first embodiment.

Once the signal generating device 100 is separated from the through hole 282, the contact power switch 250 is turned on. As a result, the signal receiving device 200 is turned on to allow input of information (refer to FIG. 4B(a)).

Like in the first embodiment, a hand power switch 260, configured to turn off the signal receiving device 200 and then to turn on the signal receiving device 200 through a user's manipulation while the user inputs position information, is installed at the housing 270 of the signal receiving device 200. The hand power switch 260 of the second embodiment has the same function as that of the first embodiment, and thus detailed explanations thereof will be omitted.

Figure 5A:
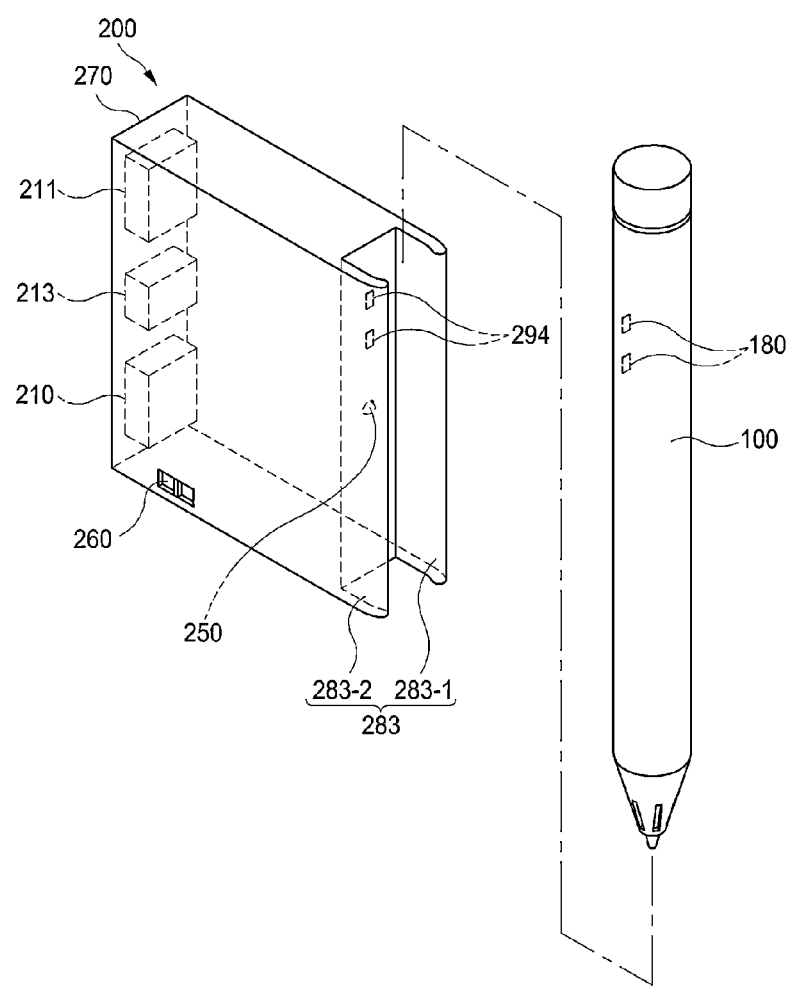
FIGS. 5A and 5B are views illustrating a configuration of an information input system according to a third embodiment of the present invention.
Figure 5B:
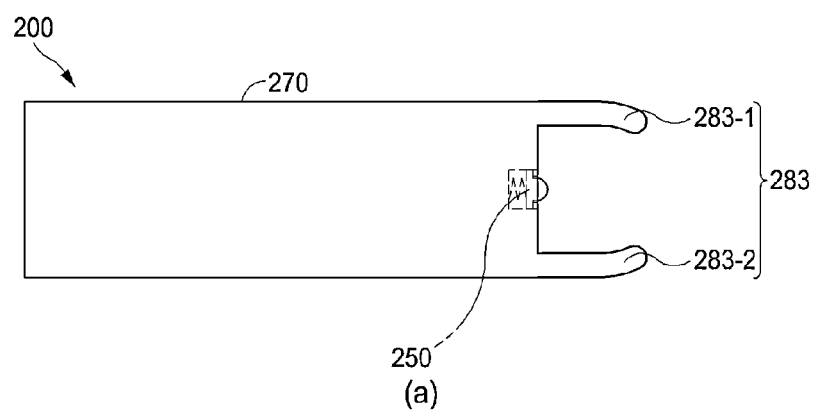
Figure 5B:
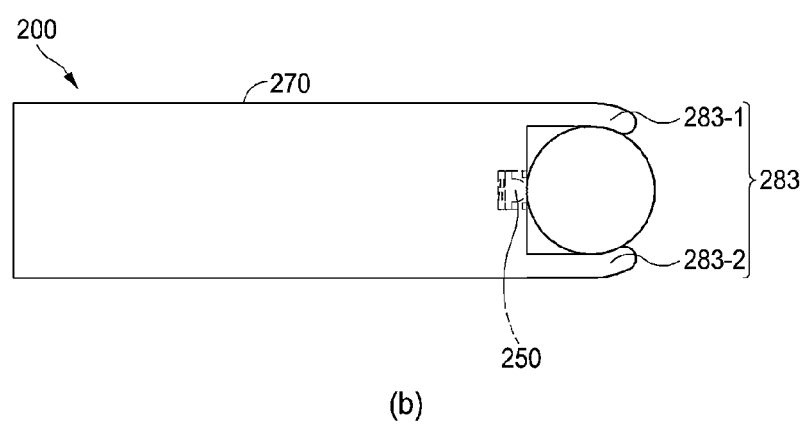

FIGS. 5A and 5B are views illustrating a configuration of an information input system according to a third embodiment of the present invention, Referring to FIGS. 5A and 5B, a coupling unit 283 of the information input system according to a third embodiment of the present invention has a structure where the through hole, the coupling unit 282 of the signal receiving device 200 according to a second embodiment, has its one side surface removed.

The coupling unit 283 of the signal receiving device 200 according to the third embodiment of the present invention is implemented as a pair of fixing units 283-1, 283-2 integrally formed with the housing 270 and outward extending from one side surface of the housing 270. As the signal generating device 100 is inserted between the pair of fixing units 283-1, 283-2, a coupled state between the signal generating device 100 and the signal receiving unit 200 is maintained. In the third embodiment, the housing 270 of the signal receiving device 200 is formed of a plastic material. Accordingly, the pair of fixing units 283-1, 283-2, which extend from the housing 270, have an elastic force. By such elastic force, the signal generating device 100 may be inserted into or separated from the pair of fixing units 283-1, 283-2, through a space between the fixing units 283-1, 283-2. The signal generating device 100 may be also inserted into or separated from the pair of fixing units 283-1, 283-2, through an upper space and a lower space of the fixing units 283-1, 283-2.

A contact power switch 250, which is turned on or off by contacting an outer surface of the signal generating device 100 in a coupled state to the signal generating device 100, is provided on an outer surface of the housing 270 between the pair of fixing units 283-1, 283-2. Like in the first and second embodiments, once the signal generating device 100 is inserted between the fixing units 283-1, 283-2, the contact power switch 250 comes in contact with the signal generating device 100 to thus be turned off. As a result, the signal receiving device 200 is turned off (refer to FIG. 5B(a)).

In a coupled state between the signal generating device 100 and the signal receiving device 200, the first charging terminal 180 and the second charging terminal 294 come in contact with each other, so that both of the signal generating device 100 and the signal receiving device 200 can be charged. Such configuration is the same as the configuration of the first embodiment.

Once the signal generating device 100 is separated from the pair of fixing units 283-1, 283-2, the contact power switch 250 is turned on. As a result, power is supplied to the signal receiving device 200 to turn on the signal receiving device 200 (refer to FIG. 5B(b)).

Like in the first and second embodiments, a hand power switch 260, configured to turn off the signal receiving device 200 and then to turn on the signal receiving device 200 through a user's manipulation while the user inputs position information, is installed at the housing 270 of the signal receiving device 200. The hand power switch 260 of the third embodiment has the same function as that of the first and second embodiments, and thus detailed explanations thereof will be omitted.

Figure 6A:
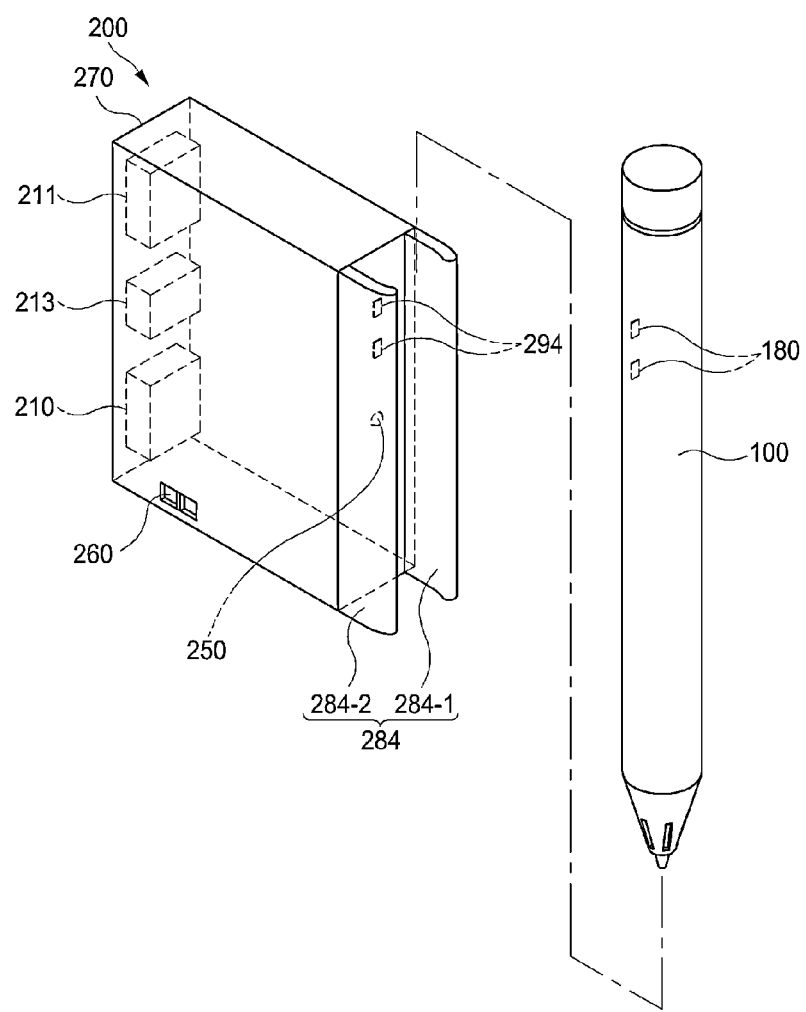
FIGS. 6A and 6B are views illustrating a configuration of an information input system according to a fourth embodiment of the present invention.
Figure 6B:
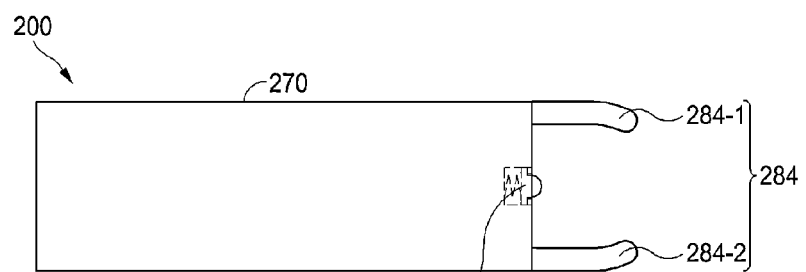
Figure 6B:
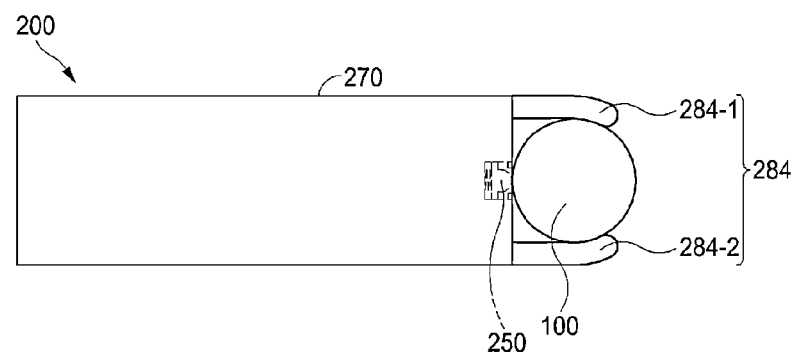

FIGS. 6A and 6B are views illustrating a configuration of an information input system according to a fourth embodiment of the present invention.

Referring to FIGS. 6A and 6B, a coupling unit 284 of the signal receiving device 200 is implemented as a pair of fixing units 284-1, 284-2 coupled to the housing 270 so as to face each other with an interval therebetween. The signal generating device 100 is inserted between the pair of fixing units 284-1, 284-2, thereby maintaining a coupled state to the coupling unit 284 by an elastic force of the fixing units 284-1, 284-2.

The pair of fixing units 284-1, 284-2 may be formed of a transparent plastic material, and may be coupled to the housing 270 of the signal receiving device 200 by an adhesive, etc.

A contact power switch 250, which is turned on or off by contacting an outer surface of the signal generating device 100 in a coupled state to the signal generating device 100, is provided on an outer surface of the housing 270 between the pair of fixing units 284-1, 284-2. Once the signal generating device 100 is inserted between the fixing units 284-1, 284-2, the contact power switch 250 is pressed to thus be turned off. As a result, the signal receiving device 200 is turned off (refer to FIG. 6B(b)).

In a coupled state between the signal generating device 100 and the signal receiving device 200, the first charging terminal 180 and the second charging terminal 294 come in contact with each other, so that both of the signal generating device 100 and the signal receiving device 200 can be charged. Such configuration is the same as the configuration of the first embodiment.

Once the signal generating device 100 is separated from the pair of fixing units 284-1, 284-2, the contact power switch 250 is turned on. As a result, the signal receiving device 200 is turned on (refer to FIG. 6B(a)).

Like in the first to third embodiments, a hand power switch 260, configured to turn off the signal receiving device 200 and then to turn on the signal receiving device 200 through a user's manipulation while the user inputs position information, is installed at the housing 270 of the signal receiving device 200. The hand power switch 260 of the fourth embodiment has the same function as that of the first to third embodiments, and thus detailed explanations thereof will be omitted.

Figure 7A:
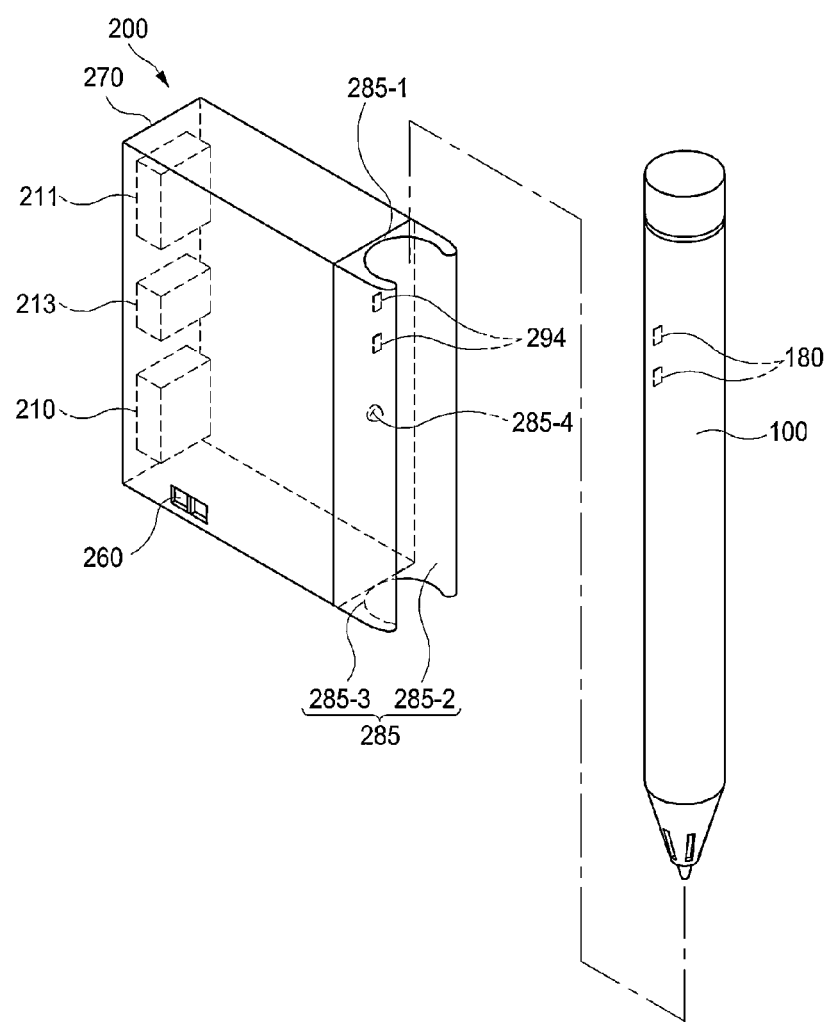
FIGS. 7A and 7B are views illustrating a configuration of an information input system according to a fifth embodiment of the present invention.
Figure 7B:
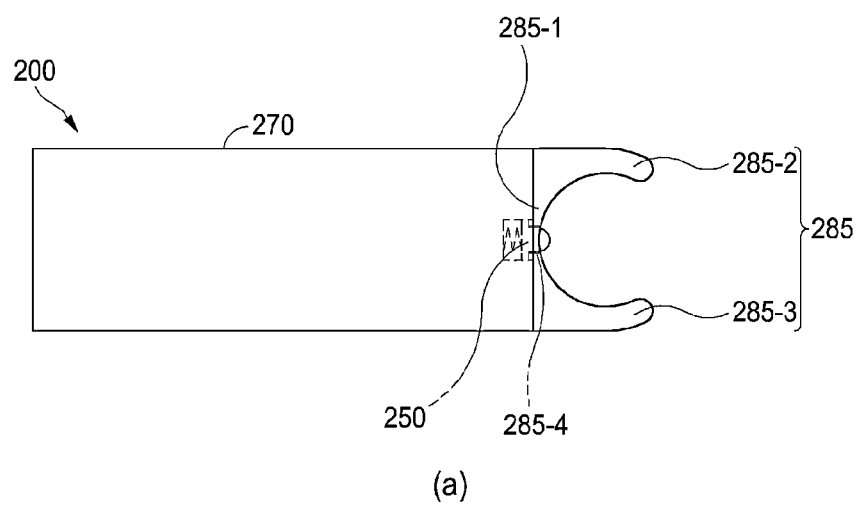
Figure 7B:
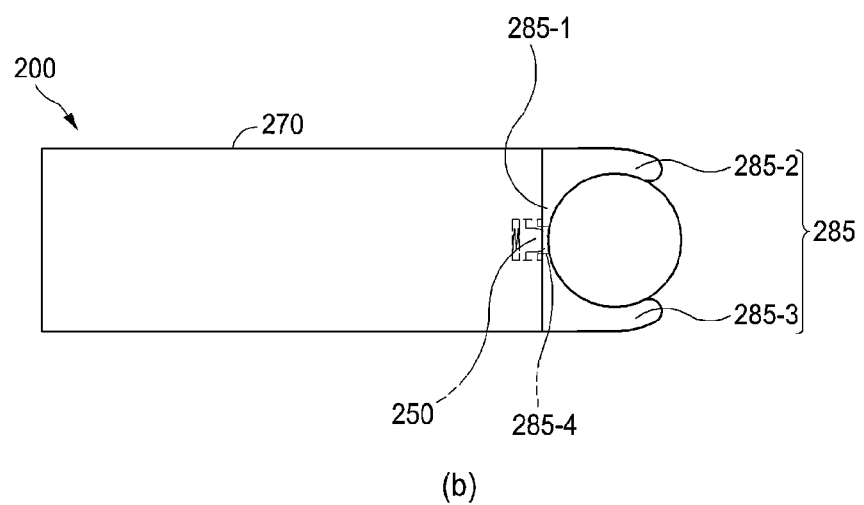

FIGS. 7A and 7B are views illustrating a configuration of an information input system according to a fifth embodiment of the present invention.

Referring to FIGS. 7A and 7B, a coupling unit 285 formed at the signal receiving device 200 includes a bonding unit 285-1 adhered to the housing 270, and a pair of fixing units 285-2, 285-3 extending from both ends of the bonding unit 285-1 in a vertical direction.

The coupling unit 285 of the fifth embodiment may be formed of a transparent plastic material, and the signal generating device 100 is inserted between the pair of fixing units 285-2, 285-3, through a space therebetween. Alternatively, the signal generating device 100 may be inserted into the coupling unit 285 through an upper space or a lower space of the fixing units 285-2, 285-3, and may be fixed in the coupling unit 285 by an elastic force of the fixing units 285-2, 285-3.

The bonding unit 285-1 may be adhered to the housing 270 of the signal receiving device 200 by an adhesive. A contact power switch groove 285-4, through which the contact power switch 250 formed at the housing 270 is exposed to outside to thus contact the signal generating device 100, is formed in the bonding unit 285-1.

The contact power switch 250 installed at the housing 270 is exposed to outside through the contact power switch groove 285-4 formed at the bonding unit 285-1, the outside to which the signal generating device 100 is to be coupled. Once the signal generating device 100 is inserted between the fixing units 285-2, 285-3 to thus be coupled to the signal receiving device 200, the contact power switch 250 is pressed by the signal generating device 100 to thus be turned off. As a result, the signal receiving device 200 is turned off (refer to FIG. 7B(b)).

In a coupled state between the signal generating device 100 and the signal receiving device 200, the first charging terminal 180 and the second charging terminal 294 come in contact with each other, so that both of the signal generating device 100 and the signal receiving device 200 can be charged. Such configuration is the same as the configuration of the first embodiment.

Once the signal generating device 100 is separated from the pair of fixing units 285-2, 285-3, the contact power switch 250 is turned on. As a result, the signal receiving device 200 is turned on (refer to FIG. 7B(a)).

Like in the first to fourth embodiments, a hand power switch 260, configured to turn off the signal receiving device 200 and then to turn on the signal receiving device 200 through a user's manipulation while the user inputs position information, is installed at the housing 270 of the signal receiving device 200. The hand power switch 260 of the fifth embodiment has the same function as that of the first to fourth embodiments, and thus detailed explanations thereof will be omitted.

Figure 8A:
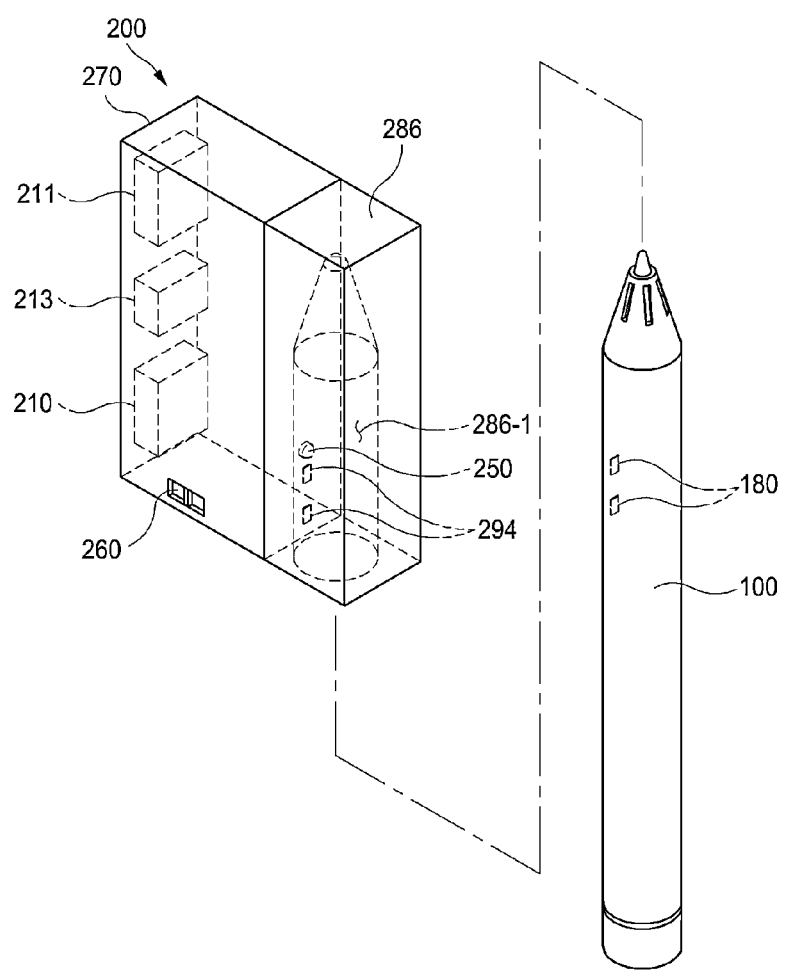
FIGS. 8A and 8B are views illustrating a configuration of an information input system according to a sixth embodiment of the present invention.
Figure 8B:
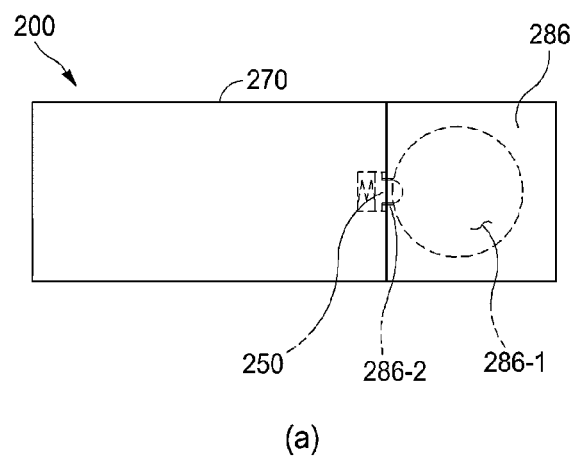
Figure 8B:
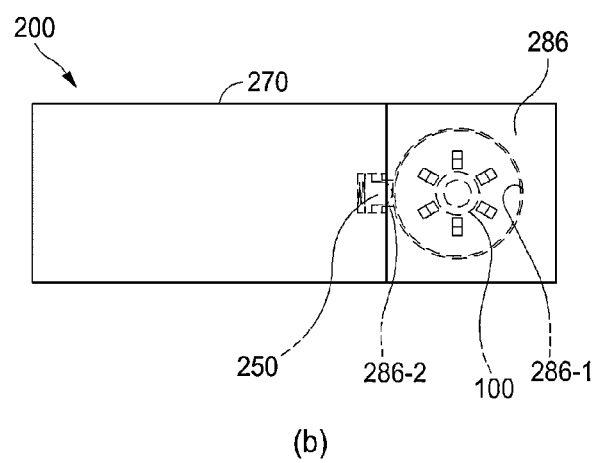

FIGS. 8A and 8B are views illustrating a configuration of an information input system according to a sixth embodiment of the present invention.

Referring to FIGS. 8A and 8B, a coupling unit 286, formed at the signal receiving device 200 of the information input system according to a sixth embodiment of the present invention, has one side surface adhered to one side surface of the housing 270 of the signal receiving device 200. The coupling unit 286 is provided therein with an accommodation groove 286-1 for accommodating the signal generating device 100. The coupling unit 286 is formed of a transparent plastic material, so that a user can view inside of the coupling unit 286 from outside.

A contact power switch groove 286-2, through which the contact power switch 250 installed at the housing 270 of the signal receiving device 200 is exposed to inside of the accommodation groove 286-1, is formed in the accommodation groove 286-1. The contact power switch 250 protrudes toward inside of the accommodation groove 286-1, through the contact power switch groove 286-2. In a state where the signal generating device 100 has been accommodated in the accommodation groove 286-1, the contact power switch 250 maintains an OFF' state by being pressed by the signal generating device 100. As a result, the signal receiving device 200 also maintains an OFF' state (refer to FIG. 8B(b)).

In a coupled state between the signal generating device 100 and the signal receiving device 200, the first charging terminal 180 and the second charging terminal 294 come in contact with each other, so that both of the signal generating device 100 and the signal receiving device 200 can be charged. Such configuration is the same as the configuration of the first embodiment.

Once the signal generating device 100 is separated from the accommodation groove 286-1, the contact power switch 250 is turned on. As a result, the signal receiving device 200 is also turned on to be supplied with power (refer to FIG. 8B(a)).

Like in the first to fifth embodiments, a hand power switch 260, configured to turn off the signal receiving device 200 and then to turn on the signal receiving device 200 through a user's manipulation while the user inputs position information, is installed at the housing 270 of the signal receiving device 200. The hand power switch 260 of the sixth embodiment has the same function as that of the first to fifth embodiments, and thus detailed explanations thereof will be omitted.

Figure 9A:
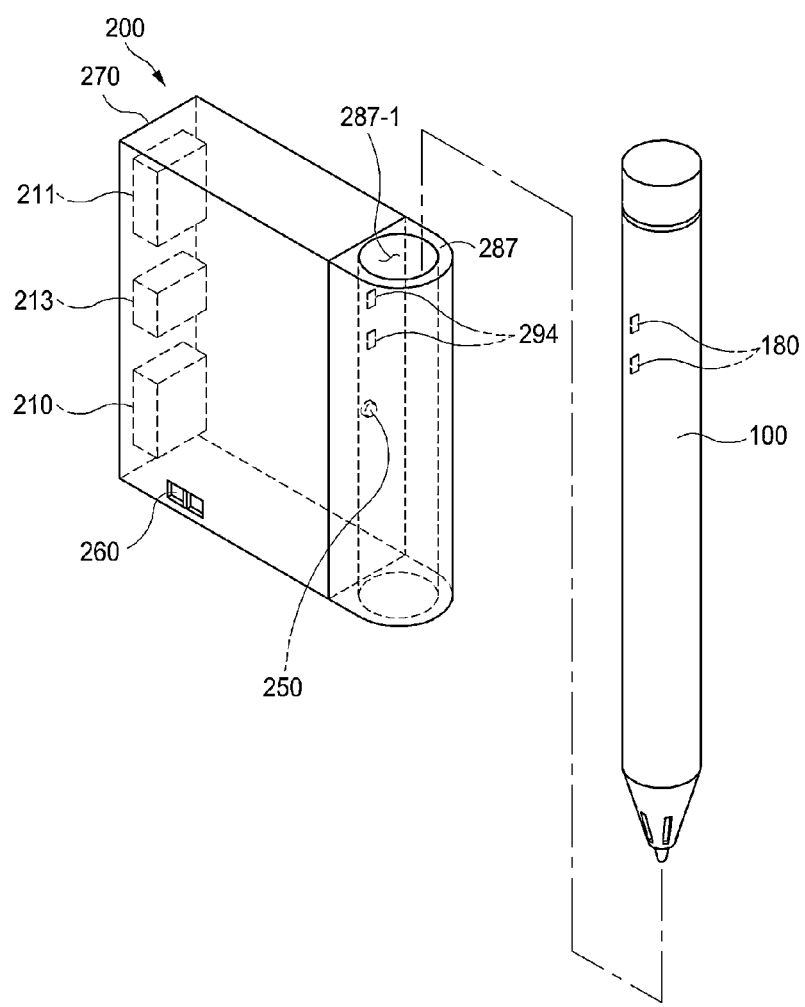
FIGS. 9A and 9B are views illustrating a configuration of an information input system according to a seventh embodiment of the present invention.
Figure 9B:
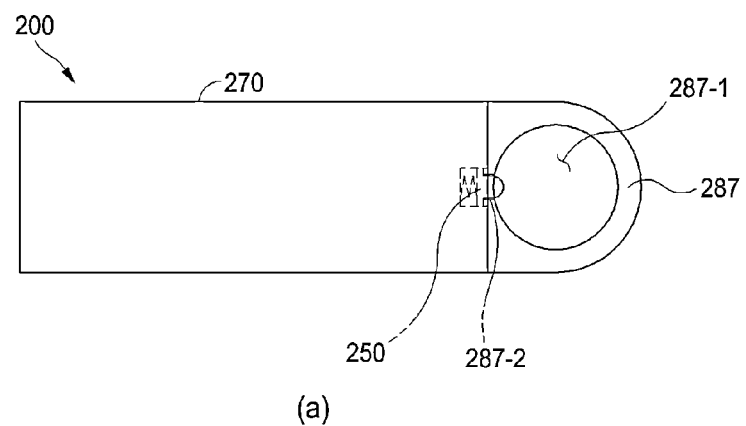
Figure 9B:
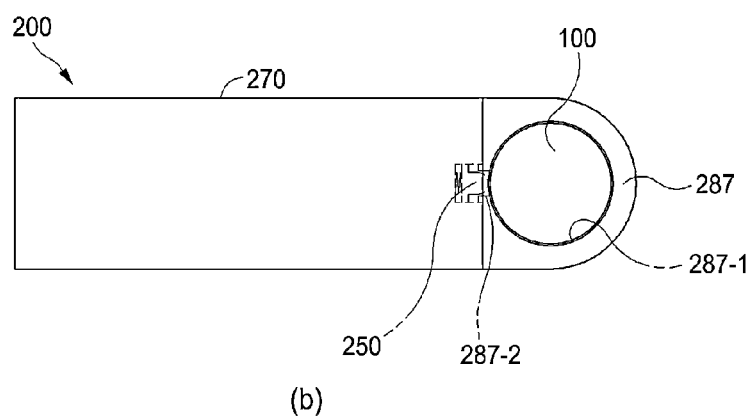

FIGS. 9A and 9B are views illustrating a configuration of an information input system according to a seventh embodiment of the present invention.

Referring to FIGS. 9A and 9B, a coupling unit 287, formed at the signal receiving device 200 of the information input system according to a seventh embodiment of the present invention, has one side surface adhered to one side surface of the housing 270. The coupling unit 287 has therein a through hole 287-1 formed in a lengthwise direction of the signal generating device 100. A contact power switch groove 287-2 is formed at a contact surface between the housing 270 and the coupling unit 287, so that the contact power switch 250 may contact the signal generating device 100 inserted into the through hole 287-1.

The contact power switch 250 protrudes toward inside of the through hole 287-1, via the contact power switch groove 287-2. Once the signal generating device 100 is inserted into the coupling unit 287 via the through hole 287-1, the contact power switch 250 is pressed by the signal generating device 100 to thus be turned off. As a result, the signal receiving device 200 is also turned off.

In a coupled state between the signal generating device 100 and the signal receiving device 200, the first charging terminal 180 and the second charging terminal 294 come in contact with each other, so that both of the signal generating device 100 and the signal receiving device 200 can be charged. Such configuration is the same as the configuration of the first embodiment.

Once the signal generating device 100 is separated from the through hole 287-1 by a user, the contact power switch 250 is turned on. As a result, the signal receiving device 200 is also turned on to allow input of position information.

Preferably, the coupling unit 287 is formed of a transparent plastic material, so that a user can view inside of the coupling unit 287 from outside.

Like in the first to sixth embodiments, a hand power switch 260, configured to turn off the signal receiving device 200 and then to turn on the signal receiving device 200 through a user's manipulation while the user inputs position information, is installed at the housing 270 of the signal receiving device 200. The hand power switch 260 of the seventh embodiment has the same function as that of the first to sixth embodiments, and thus detailed explanations thereof will be omitted.

Figure 10A:
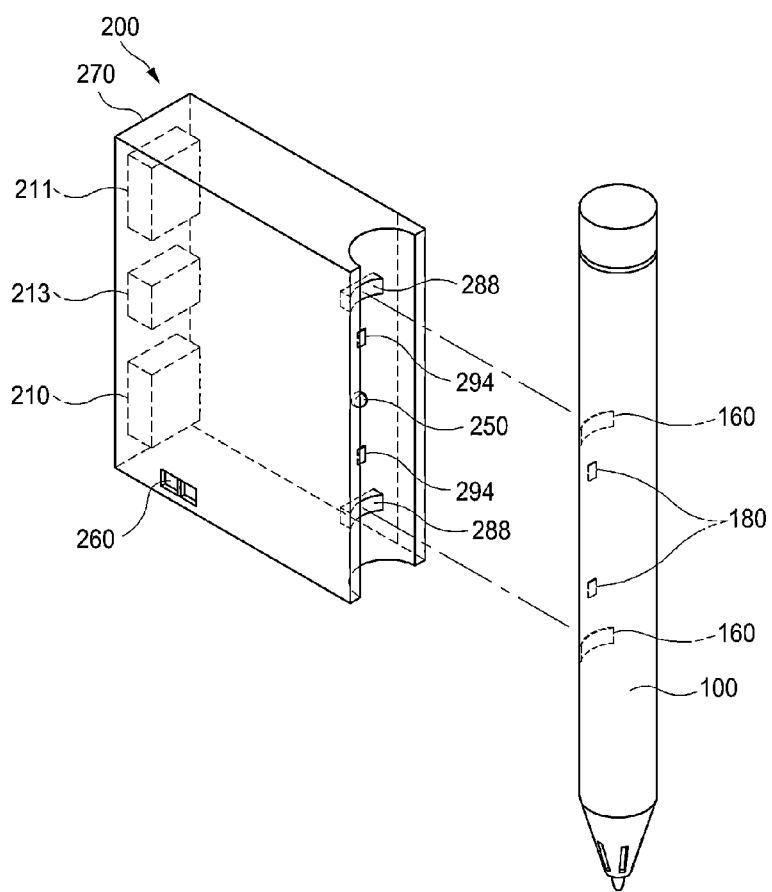
FIGS. 10A and 10B are views illustrating a configuration of an information input system according to an eighth embodiment of the present invention.
Figure 10B:
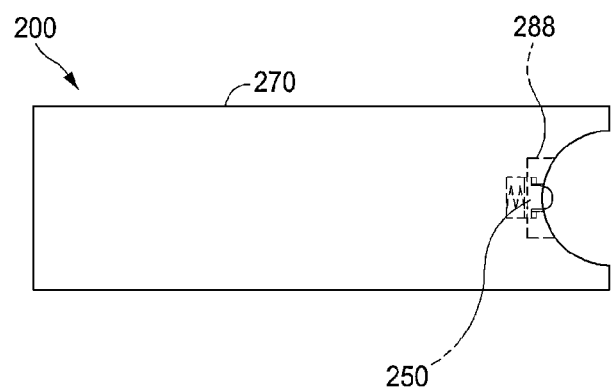
Figure 10B:
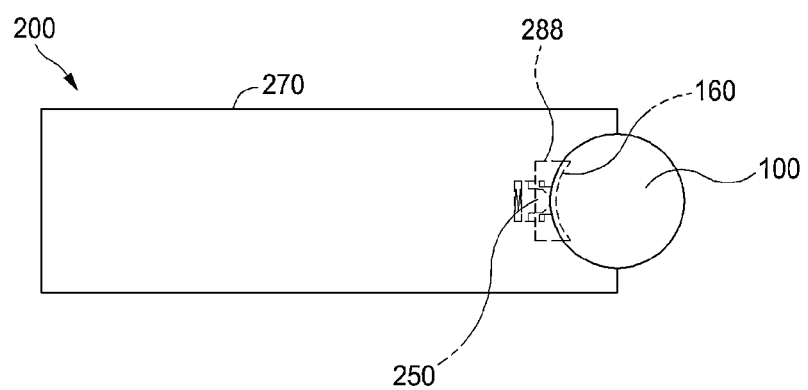

FIGS. 10A and 10B are views illustrating a configuration of an information input system according to an eighth embodiment of the present invention.

Referring to FIGS. 10A and 10B, a signal generating device 100 and a signal receiving device 200 are coupled to each other by a magnetic force, in the information input system according to an eighth embodiment of the present invention.

Magnetic substances 288 are installed on one side surface of a housing 270 of the signal receiving device 200, where the signal generating device 100 is to be coupled. The signal generating device 100 includes therein metallic members which can be coupled to the magnetic substance 288 by a magnetic force. Alternatively, magnetic substances may be installed at the signal generating device 100, and metallic members, which can be coupled to the magnetic substances of the signal generating device 100, may be installed at the housing 270 of the signal receiving unit 200.

The contact power switch 250 is installed on the same surface as the magnetic substances 288. Once the signal generating device 100 is coupled to the signal receiving device 200 by a magnetic force, the contact power switch 250 comes in contact with the signal generating device 100 to thus be turned off. As a result, the signal receiving device 200 is also turned off.

In a coupled state between the signal generating device 100 and the signal receiving device 200, the first charging terminal 180 and the second charging terminal 294 come in contact with each other, so that both of the signal generating device 100 and the signal receiving device 200 can be charged. Such configuration is the same as the configuration of the first embodiment.

Once the signal generating device 100 is separated from the signal receiving device 200 by a user, the contact power switch 250 is turned on. As a result, the signal receiving device 200 is also turned on to allow input of position information.

Like in the first to seventh embodiments, a hand power switch 260, configured to turn off the signal receiving device 200 and then to turn on the signal receiving device 200 through a user's manipulation while the user inputs position information, is installed at the housing 270 of the signal receiving device 200. The hand power switch 260 of the eighth embodiment has the same function as that of the first to seventh embodiments, and thus detailed explanations thereof will be omitted.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A position information input system comprising:
a signal generating device formed to have a pen shape, and configured to generate an ultrasonic signal and a reference signal; and
a signal receiving device configured to generate position information by measuring a position of the signal generating device by receiving the ultrasonic signal and the reference signal from the signal generating device, or configured to generate position measuring information used to measure a position of the signal generating device by receiving the ultrasonic signal and the reference signal from the signal generating device, and to transmit the position information or the position measuring information to an external electronic device,
wherein a coupling unit, configured to couple the signal generating device to the signal receiving device, is formed at a housing of the signal receiving device,
wherein a contact power switch is installed on a surface of the housing in correspondence to the signal generating device,
wherein the contact power switch is turned on or off by contacting the signal generating device, to turn on or off the signal receiving device,
wherein a first charging terminal is installed at the signal generating device,
wherein a second charging terminal is installed at the housing, so as to contact the first charging terminal in a coupled state between the signal generating device and the signal receiving device,
wherein a second charging power source connection unit, configured to connect an external charging power source to the second charging terminal, is installed at the signal receiving device, and
wherein the external charging power source, connected to the second charging power source connection unit, simultaneously charges the signal receiving device and the signal generating device in a connected state between the first charging terminal and the second charging terminal.

2. A position information input system, comprising:
a signal generating device formed to have a pen shape, and configured to generate an ultrasonic signal and a reference signal; and
a signal receiving device configured to generate position information by measuring a position of the signal generating device by receiving the ultrasonic signal and the reference signal from the signal generating device, or configured to generate position measuring information used to measure a position of the signal generating device by receiving the ultrasonic signal and the reference signal from the signal generating device, and to transmit the position information or the position measuring information to an external electronic device,
wherein a coupling unit, configured to couple the signal generating device to the signal receiving device, is formed at a housing of the signal receiving device,
wherein a contact power switch is installed on a surface of the housing in correspondence to the signal generating device,
wherein the contact power switch is turned on or off by contacting the signal generating device, to turn on or off the signal receiving device,
wherein the coupling unit is coupled to the signal generating device by a magnetic substance,
wherein if the signal generating device is coupled to the coupling unit, the contact power switch is turned off to turn off the signal receiving device, and
wherein if the signal generating device is separated from the coupling unit, the contact power switch is turned on to turn on the signal receiving device.

3. The position information input system of claim 2, wherein the coupling unit is implemented as a magnetic substance or a metallic member, and
wherein the signal generating device includes a magnetic substance or a metallic member so as to be coupled to the coupling unit by a magnetic force.

4. The position information input system of claim 3, wherein a first charging power source connection unit, configured to connect an external charging power source to a first charging terminal, is installed at the signal generating device,
wherein a second charging power source connection unit, configured to connect the external charging power source to a second charging terminal, is installed at the signal receiving device, and
wherein the external charging power source, connected to the first charging power source connection unit or the second charging power source connection unit, is simultaneously connected to the first charging terminal and the second charging terminal, in a connected state between the first charging terminal and the second charging terminal, such that the signal generating device and the signal receiving device are simultaneously charged by a single external charging power source.

5. A position information input system, comprising:
a signal generating device formed to have a pen shape, and configured to generate an ultrasonic signal and a reference signal; and
a signal receiving device configured to generate position information by measuring a position of the signal generating device by receiving the ultrasonic signal and the reference signal from the signal generating device, or configured to generate position measuring information, used to measure a position, of the signal generating device by receiving the ultrasonic signal and the reference signal from the signal generating device, and to transmit the position information or the position measuring information to an external electronic device,
wherein a coupling unit, configured to couple the signal generating device to the signal receiving device, is formed at a housing of the signal receiving device,
wherein a contact power switch is installed on a surface of the housing in correspondence to the signal generating device,
wherein the contact power switch is turned on or off by contacting the signal generating device, to turn on or off the signal receiving device,
wherein the coupling unit includes:
a bonding unit adhered to the housing; and
a pair of fixing units extending from both ends of the bonding unit in a vertical direction,
wherein the signal generating device is inserted between the pair of fixing units, to thus be fixed by an elastic force of the pair of fixing units,
wherein a contact power switch groove, through which the contact power switch formed at the housing is exposed to outside to thus contact the signal generating device, is formed in the bonding unit,
wherein if the signal generating device is inserted between the pair of fixing units, the contact power switch is turned off to turn off the signal generating device, and wherein if the signal generating device is separated from the pair of fixing units, the contact power switch is turned on to turn on the signal generating device.

6. The position information input system of claim 5, wherein the coupling unit is formed of a transparent plastic material.

7. A position information input system, comprising:
- a signal generating device formed to have a pen shape, and configured to generate an ultrasonic signal and a reference signal; and
- a signal receiving device configured to generate position information by measuring a position of the signal generating device by receiving the ultrasonic signal and the reference signal from the signal generating device, or configured to generate position measuring information used to measure a position of the signal generating device by receiving the ultrasonic signal and the reference signal from the signal generating device, and to transmit the position information or the position measuring information to an external electronic device,
- wherein a coupling unit, configured to couple the signal generating device to the signal receiving device, is formed at a housing of the signal receiving device,
- wherein a contact power switch is installed on a surface of the housing in correspondence to the signal generating device,
- wherein the contact power switch is turned on or off by contacting the signal generating device, to turn on or off the signal receiving device,
- wherein the coupling unit has one side surface adhered to one side surface of the housing,
- wherein the coupling unit is provided therein with an accommodation groove for accommodating the signal generating device, and
- wherein a contact power switch groove, through which the contact power switch contacts the signal generating device accommodated in the accommodation groove, is formed at a contact surface between the coupling unit and the housing.

8. The position information input system of claim 7, wherein the coupling unit is formed of a transparent plastic material.

9. A position information input system, comprising:
- a signal generating device formed to have a pen shape, and configured to generate an ultrasonic signal and a reference signal; and
- a signal receiving device configured to generate position information by measuring a position of the signal generating device by receiving the ultrasonic signal and the reference signal from the signal generating device, or configured to generate position measuring information, used to measure a position of the signal generating device by receiving the ultrasonic signal and the reference signal from the signal generating device, and to transmit the position information or the position measuring information to an external electronic device,
- wherein a coupling unit, configured to couple the signal generating device to the signal receiving device, is formed at a housing of the signal receiving device,
- wherein a contact power switch is installed on a surface of the housing in correspondence to the signal generating device,
- wherein the contact power switch is turned on or off by contacting the signal generating device, to turn on or off the signal receiving device, and
- wherein the signal receiving device further includes a hand power switch configured to turn on or off the signal receiving device, by supplying power to the signal receiving device or by disconnecting power supply to the signal receiving device, through a user's manipulation, in an 'ON' state of the contact power switch and the signal receiving device.

* * * * *